(12) United States Patent
Lewis et al.

(10) Patent No.: US 11,338,657 B2
(45) Date of Patent: May 24, 2022

(54) SLIDING SOFT TOP

(71) Applicant: Bestop, Inc., Louisville, CO (US)

(72) Inventors: Stephen J. Lewis, Harrison Township, MI (US); Tavis Lutzka, Rochester Hills, MI (US)

(73) Assignee: Bestop, Inc., Louisville, CO (US)

( * ) Notice: Subject to any disclaimer, the term of this patent is extended or adjusted under 35 U.S.C. 154(b) by 237 days.

(21) Appl. No.: 16/837,273

(22) Filed: Apr. 1, 2020

(65) Prior Publication Data

US 2020/0223297 A1 Jul. 16, 2020

Related U.S. Application Data

(63) Continuation of application No. 15/914,672, filed on Mar. 7, 2018, now Pat. No. 10,639,975, which is a continuation-in-part of application No. 15/861,194, filed on Jan. 3, 2018, now Pat. No. 10,583,720, which is a continuation-in-part of application No. 15/790,836, filed on Oct. 23, 2017, now Pat. No. 10,603,994, which is a continuation-in-part of application No. 15/595,396, filed on May 15, 2017, now Pat. No. 10,414,253.

(60) Provisional application No. 62/468,116, filed on Mar. 7, 2017, provisional application No. 62/441,810, filed on Jan. 3, 2017, provisional application No. 62/411,249, filed on Oct. 21, 2016, provisional application No. 62/336,062, filed on May 13, 2016.

(51) Int. Cl.
*B60J 7/06* (2006.01)

(52) U.S. Cl.
CPC .................................. *B60J 7/064* (2013.01)

(58) Field of Classification Search
CPC ........................................................ B60J 7/064
See application file for complete search history.

(56) References Cited

U.S. PATENT DOCUMENTS

| | | | | |
|---|---|---|---|---|
| 10,414,253 B2 * | 9/2019 | Haberkamp | ........... | B60J 7/1234 |
| 10,583,720 B2 * | 3/2020 | Haberkamp | ............. | B60J 7/061 |
| 10,603,994 B2 * | 3/2020 | Haberkamp | ........... | B60J 7/1234 |
| 10,639,975 B2 * | 5/2020 | Lewis | ...................... | B60J 7/061 |
| 2014/0103682 A1 * | 4/2014 | Lewis | ..................... | B60J 7/061 |
| | | | | 296/107.13 |

* cited by examiner

*Primary Examiner* — D Glenn Dayoan
*Assistant Examiner* — Melissa Ann Bonifazi
(74) *Attorney, Agent, or Firm* — Warn Partners, P.C.

(57) ABSTRACT

A panel top assembly for a vehicle including a controlled guide roller management system and install/release mechanism. A pivotal portion, that is rotatable between a closed position and open position, is coupled to guide assemblies slidably connected to guide track assemblies. Each guide track assembly includes a forward isolator assembly that restricts undesired movement/rattling of a roller in a guide track. A rearward isolator assembly restricts undesired movement/rattling of the roller in each guide track, and selectively keeps the roller in the track when the panel top assembly is in a down/open position. The rearward isolator assembly also includes an isolator that selectively allows an opening in the track for releasing the guide assembly from the track to move the panel top assembly to an open/stowed position, and, reinstalling the guide assembly to the track.

20 Claims, 17 Drawing Sheets

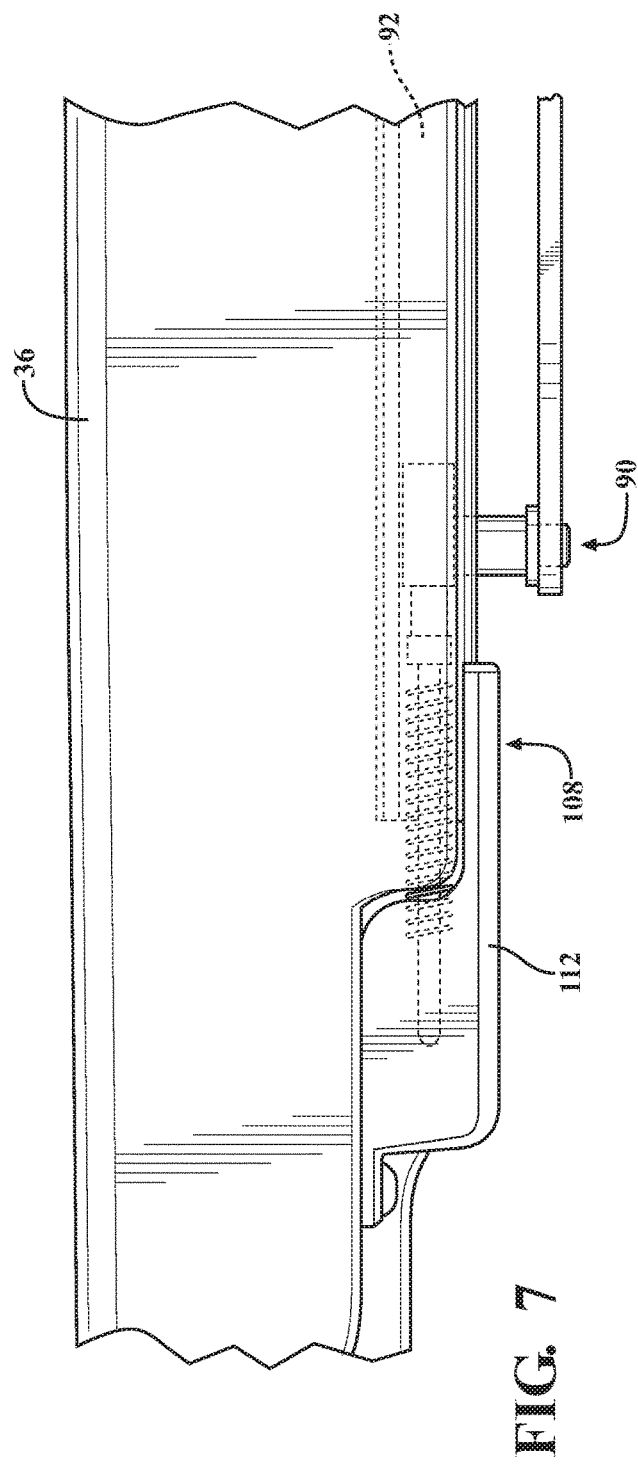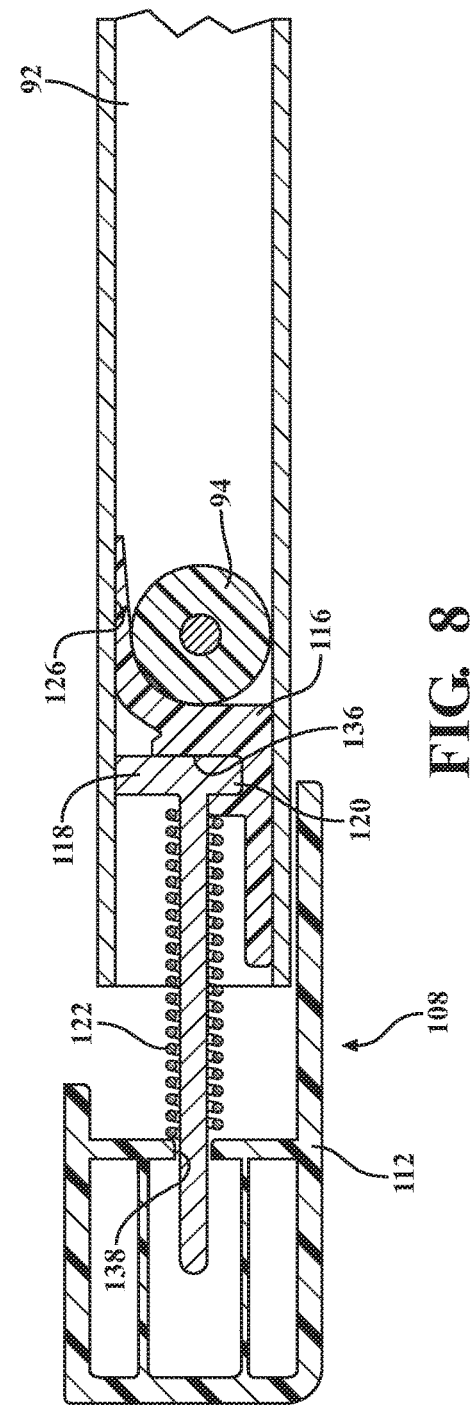

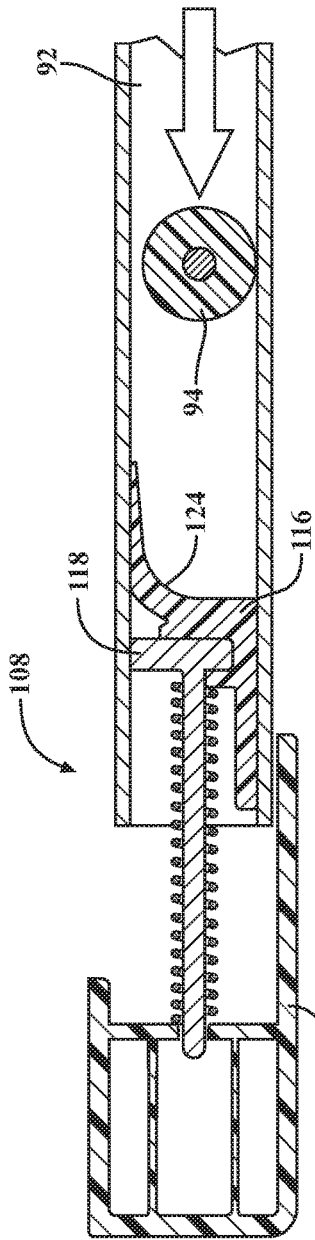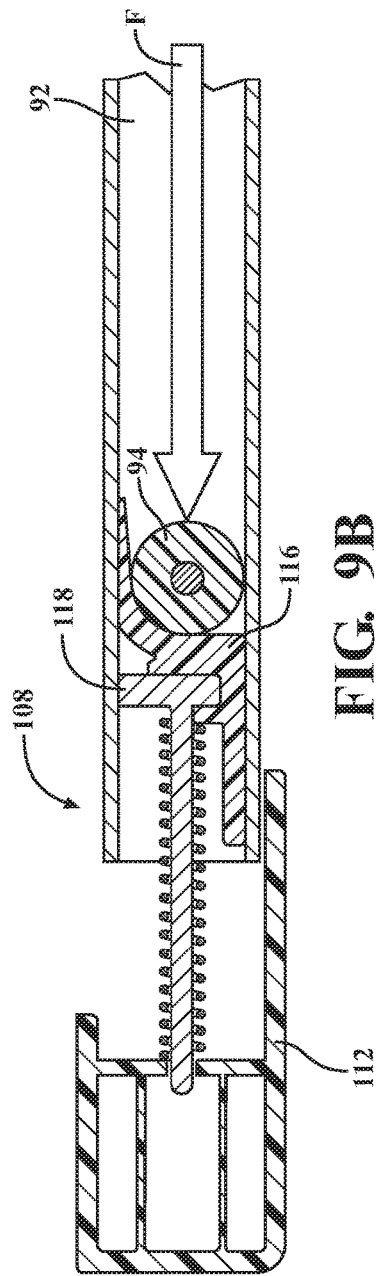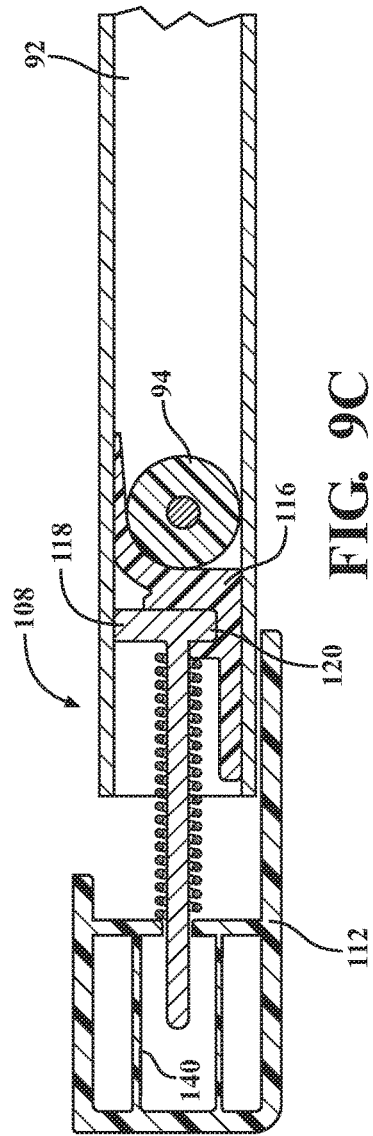

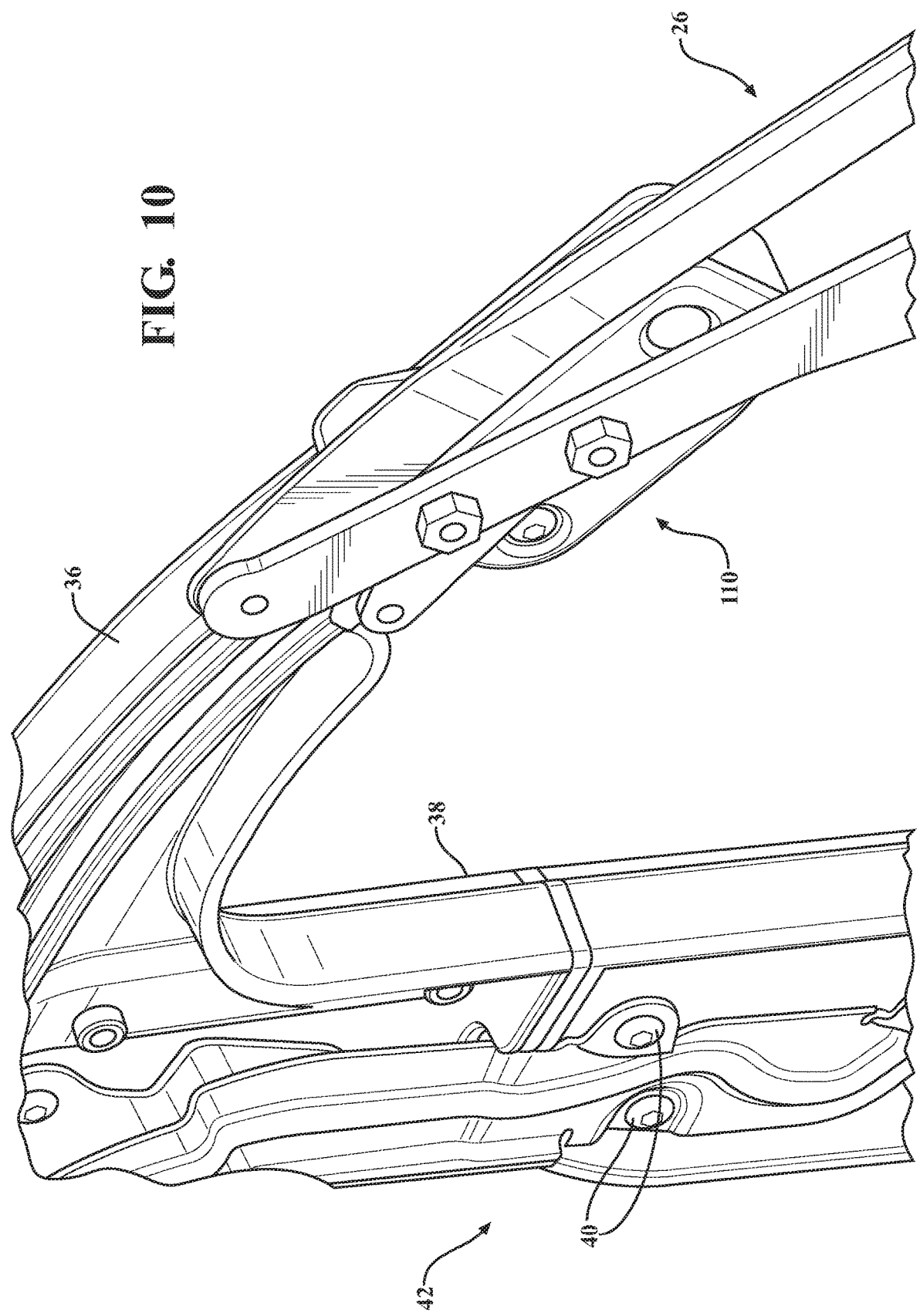

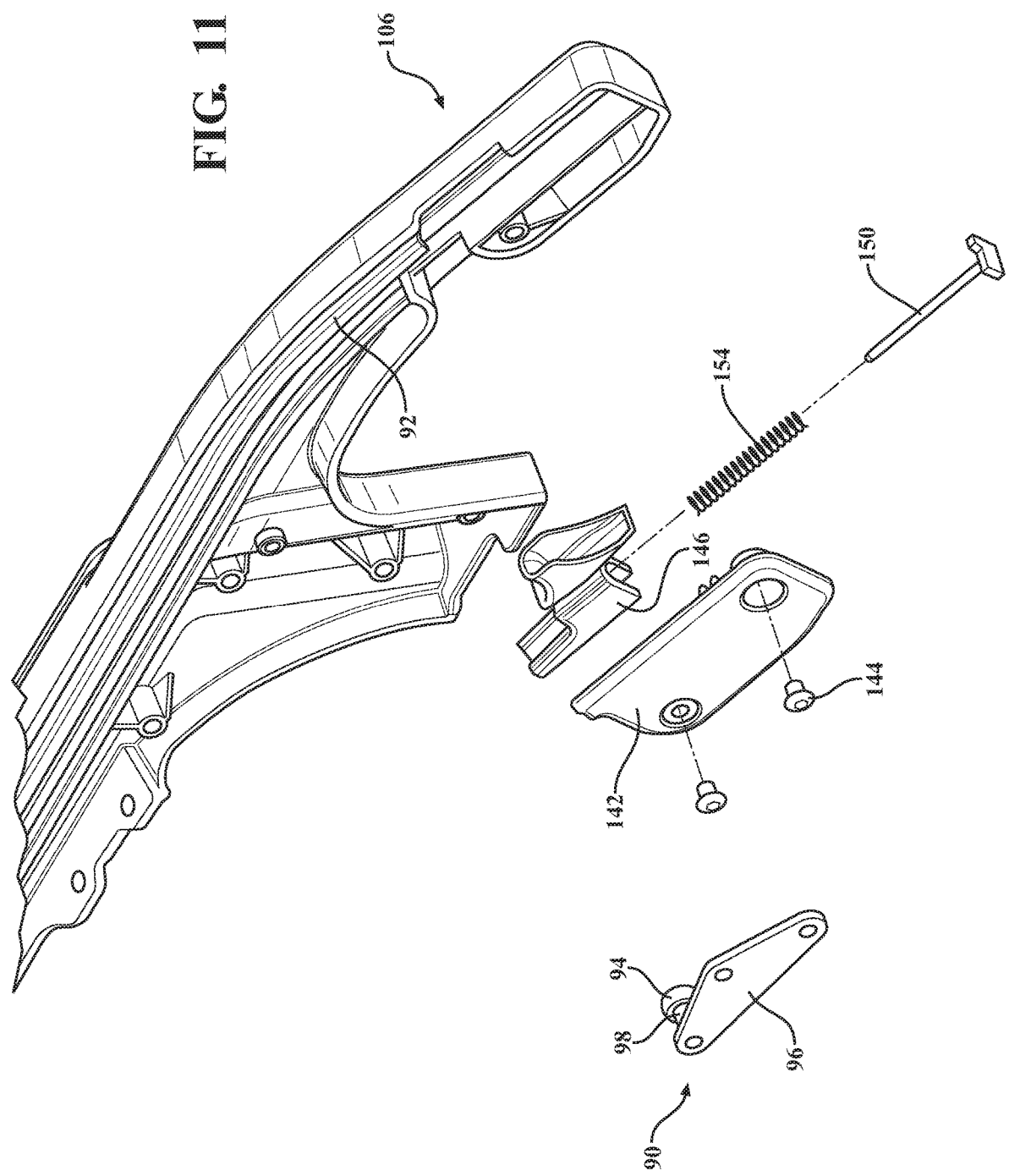

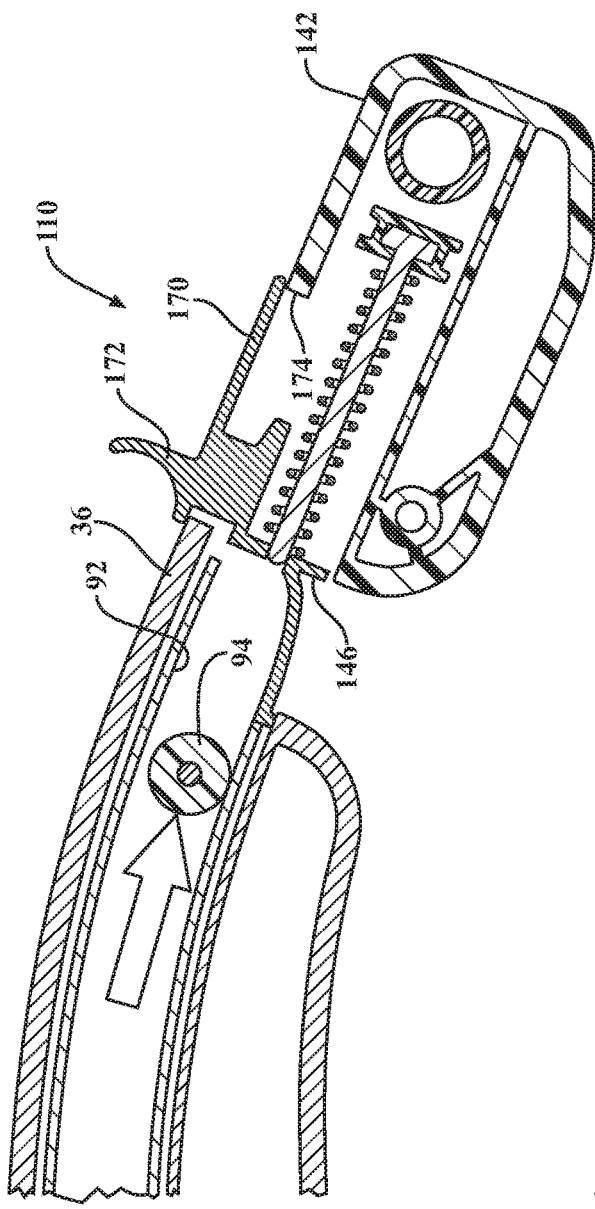
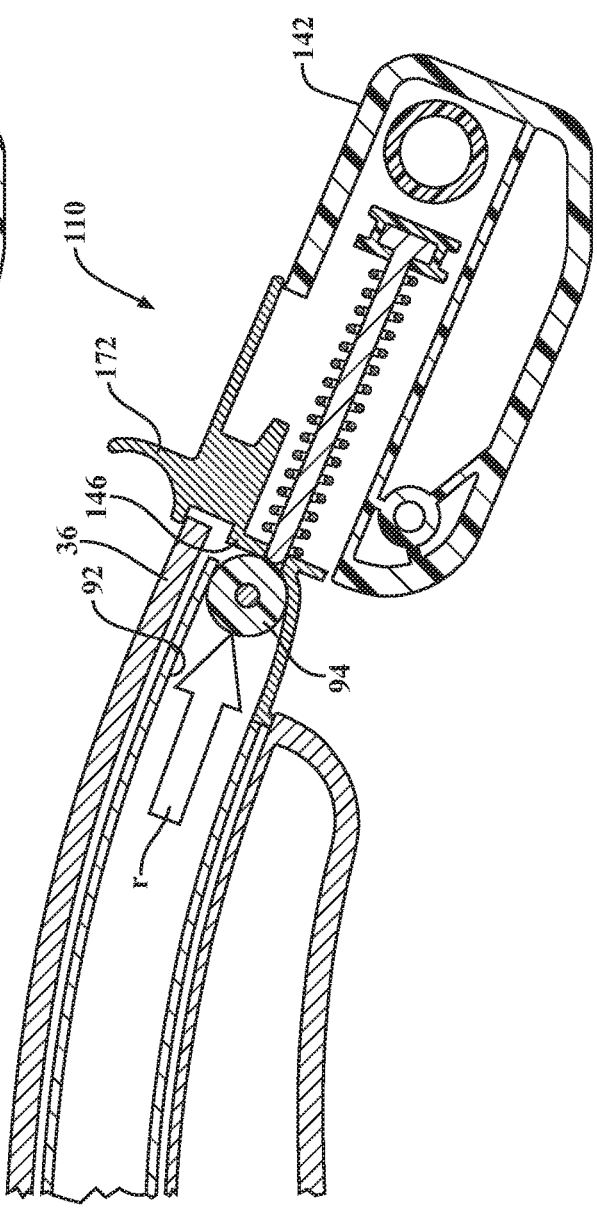
FIG. 16A
FIG. 16B

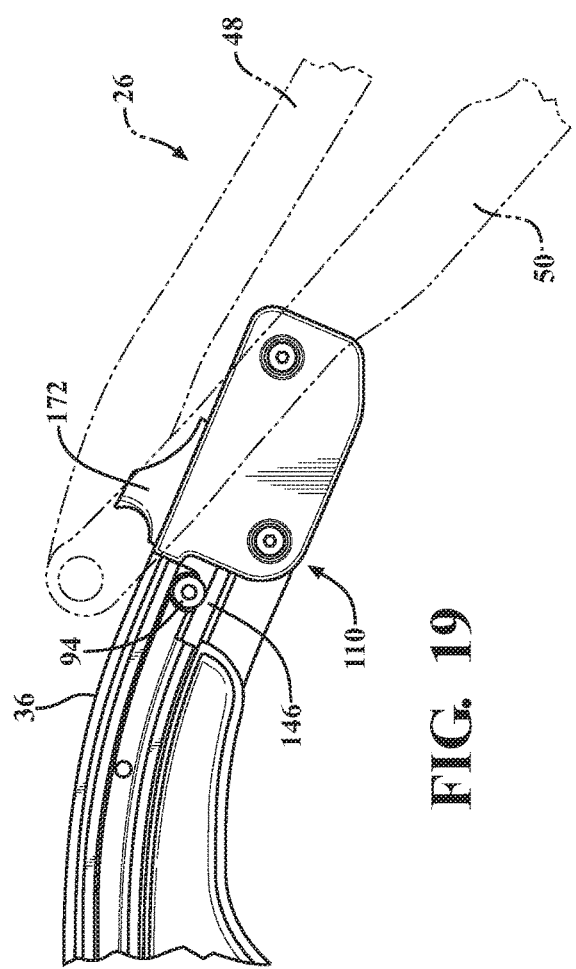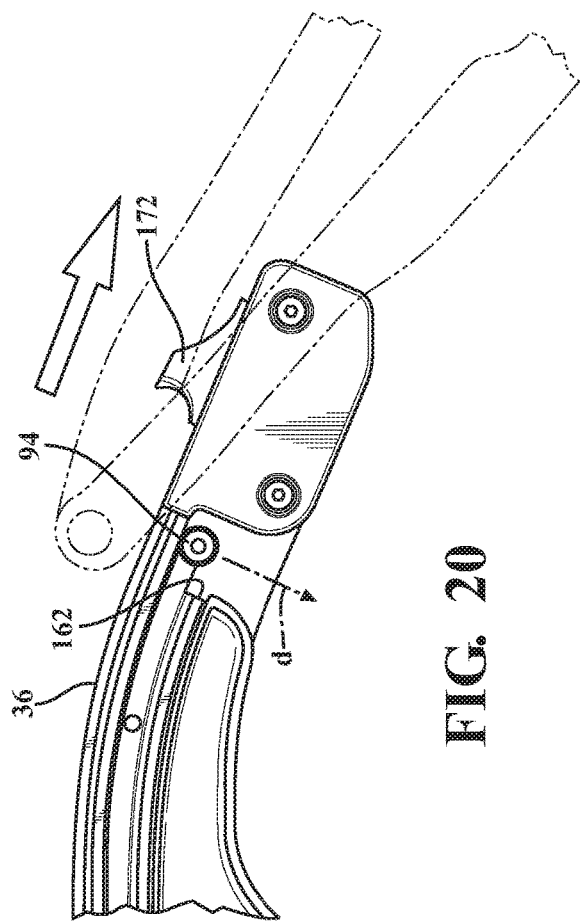

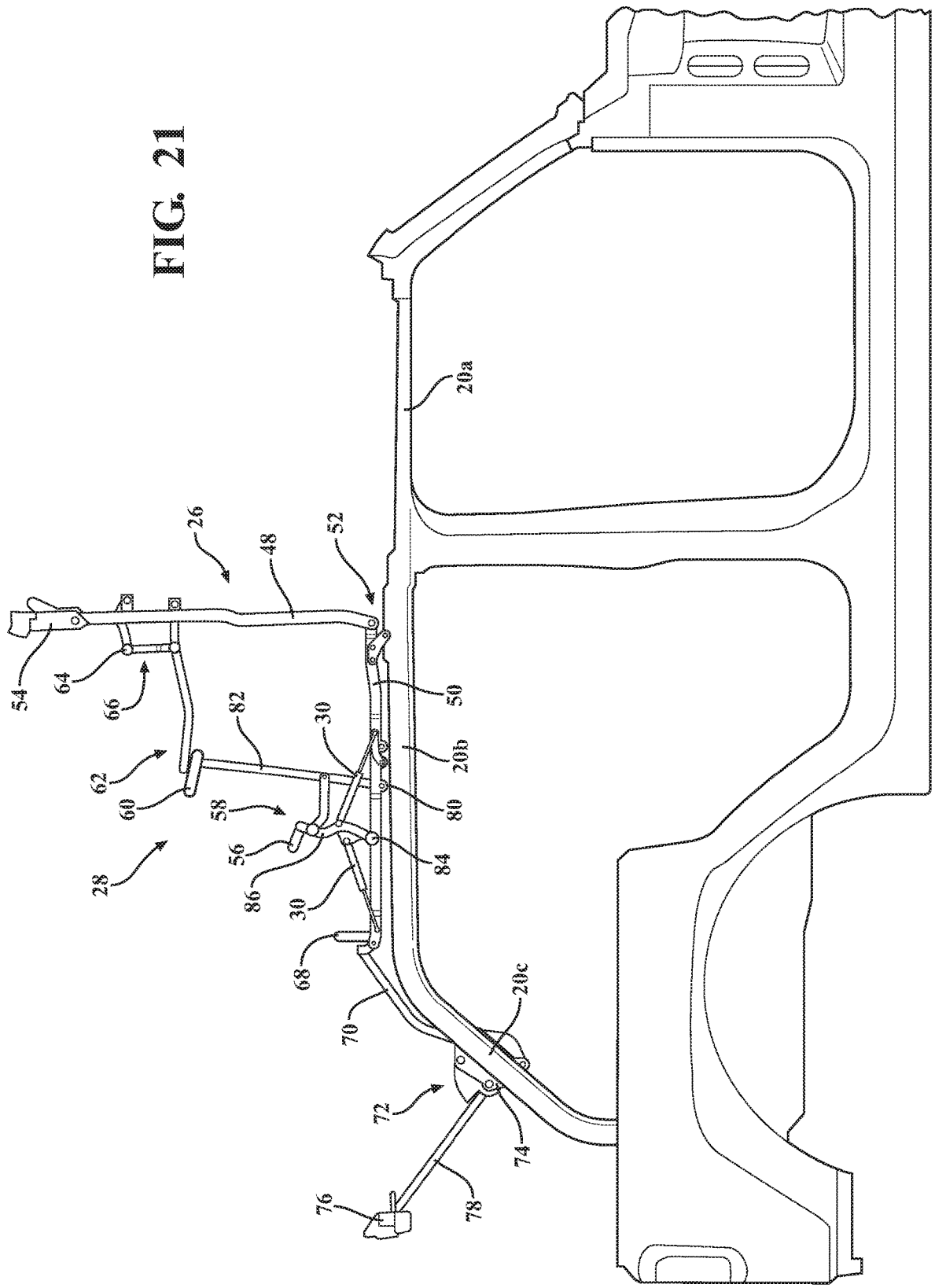

SLIDING SOFT TOP

CROSS-REFERENCE TO RELATED APPLICATIONS

The instant application is a continuation of U.S. patent application Ser. No. 15/914,672, filed Mar. 7, 2018, which is a non-provisional of 62/468,116, filed Mar. 7, 2017, and claims the benefit of U.S. Provisional Application No. 62/468,116, filed Mar. 7, 2017, and the instant application is a continuation-in-part of U.S. patent application Ser. No. 15/861,194, filed Jan. 3, 2018, which is a continuation-in-part of U.S. patent application Ser. No. 15/790,836, filed Oct. 23, 2017, which is a continuation-in-part of U.S. patent application Ser. No. 15/595,396, filed May 15, 2017, which claims the benefit of U.S. Provisional Application No. 62/336,062, filed May 13, 2016, and which also claims the benefit of U.S. Provisional Patent Application No. 62/411,249, filed Oct. 21, 2016, and said U.S. patent application Ser. No. 15/861,194, filed Jan. 3, 2018 also claims the benefit of U.S. Provisional Patent Application No. 62/441,810, filed Jan. 3, 2017. The disclosures of the above applications are incorporated herein by reference.

FIELD OF THE INVENTION

The present invention relates to an isolator/install/release mechanism for a panel top assembly moveable between a closed position and open positions.

BACKGROUND OF THE INVENTION

Providing sunroof or convertible tops for sport utility (SUV) type vehicles is desired. These roof tops are commonly used in sport-utility vehicles (SUVs) for recreational purposes. The convertible roof can typically be moved between a closed position and at least one open position. When in the closed position, the convertible roof closes off the roof top opening and protects the occupants of the vehicle from various weather conditions. However, there are occasions where the weather is pleasant, and it is desired by the occupants of the vehicle to move the convertible roof to one of its open positions such that the vehicle essentially functions with a sunroof opening, exposing the front cockpit, or without a roof where the vehicle interior is exposed to the atmosphere. This allows the occupants of the vehicle to enjoy more favorable weather conditions while driving.

However, current designs for convertible roofs are often considered quite cumbersome to move between the stowed position and the deployed position. When changed from the closed position to the open position, the occupant of the vehicle is required to lift and move the roof between various positions. The weight and size of the roof often increases the difficulty of moving the roof from the stowed position to the deployed position, or vice versa. Furthermore, current designs for various mechanisms that allow the convertible roof to have excessive or unnecessary degrees of freedom make the roof difficult to move between the deployed and stowed positions, and increase the potential for damage to the roof by the user. Tracks have been incorporated to try to alleviate some of these issues. However, there is too much free movement when the convertible roof is in the up or closed position, which allows noise from rollers positioned in the guide tracks. There is also too much free movement when the convertible roof is in a down or open position, which allows noise from the rollers positioned in the guide tracks. Another common issue is that the convertible roofs cannot be opened even further than a top down position because rollers cannot be released from the guide tracks.

Accordingly, there exists a need for an improvement in controlling the motion of a convertible roof for a vehicle that is capable of movement between a stowed position and a deployed position.

SUMMARY OF THE INVENTION

The present invention is directed to a controlled guide roller management system and install/release mechanism for a guide track system which controls the degrees of freedom and therefore the movement of a convertible roof between one open position, e.g., sunroof open position, and further open positions.

The present invention provides a guide track system for a convertible roof which includes a moveable frame assembly with a first side rail pivotally connected to a second side rail for closing off and opening up a roof top opening. The guide track system allows the movable frame assembly coupled thereto to also move to further open positions. The guide track system is provided with at least one isolator arrangement for restricting guide roller movement of the guide track system. A first isolator feature is an anti-BSR (buzz, squeak, rattle) feature between the roller and a guide track. A second isolator feature also acts as an anti-BSR feature. In addition, an install/release member is provided for selectively engaging/disengaging the movable frame assembly to/from the track. The install/release feature is generally located to the rear of the track to enable assembly of the soft top mechanism to the track. The soft top mechanism can typically move the convertible top between a top down position with the isolator held to the rear of the track, and a stowed position where the soft top mechanism is released from the track and positioned further down.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 7 is a top plan view of the isolation feature, guide roller assembly and guide track assembly, in accordance with the present invention;

FIG. 8 is a cross sectional view depicting the guide roller in a track in engagement against the isolator assembly, in accordance with the present invention;

FIG. 9A is a cross sectional view depicting the assembly shown in a free state with the guide roller assembly rolling forward in the guide track, in accordance with the present invention;

FIG. 9B is a cross sectional view depicting the assembly shown in an engage position with the guide roller assembly engaged with an isolator, in accordance with the present invention;

FIG. 9C is a cross sectional view depicting the assembly shown in a top up or closed position with the isolator and guide roller assembly slide forward into a final top up position, in accordance with the present invention;

FIG. 10 is an enlarged perspective view of Circle '10' of FIG. 1 depicting a second isolator assembly toward the rearward end of the track, in accordance with the present invention;

FIG. 11 is an exploded view of the second isolator assembly and guide roller assembly taken from FIG. 10, in accordance with the present invention;

FIG. 16A is a cross sectional view depicting the assembly shown in a free state with the guide roller assembly rolling rearward in the guide track, in accordance with the present invention;

FIG. 16B is a cross sectional view depicting the assembly shown in a top down/open position with the guide roller assembly slid rearward in direction 'r' into engagement with the isolator, in accordance with the present invention;

FIG. 19 is a side elevation view of the panel top assembly in the down/open position with the second isolator assembly keeping the guide roller assembly in the guide track, FIG. 17 is a perspective view of panel top assembly in a top down/open position, in accordance with the present invention;

FIG. 20 is a side elevation view depicting the isolator slid rearward exposing an opening in the guide track to allow the guide roller and top mechanism to come out of the track or reinstalled into the track, as desired, in accordance with the present invention;

FIG. 21 is a side elevation view of the panel top assembly rotating from the closed position to an open sunroof position, and vice versa, with a door rail assembly omitted for clarity, in accordance with the present invention.

DETAILED DESCRIPTION OF THE PREFERRED EMBODIMENTS

The following description of the preferred embodiment(s) is merely exemplary in nature and is in no way intended to limit the invention, its application, or uses.

Figure 1:
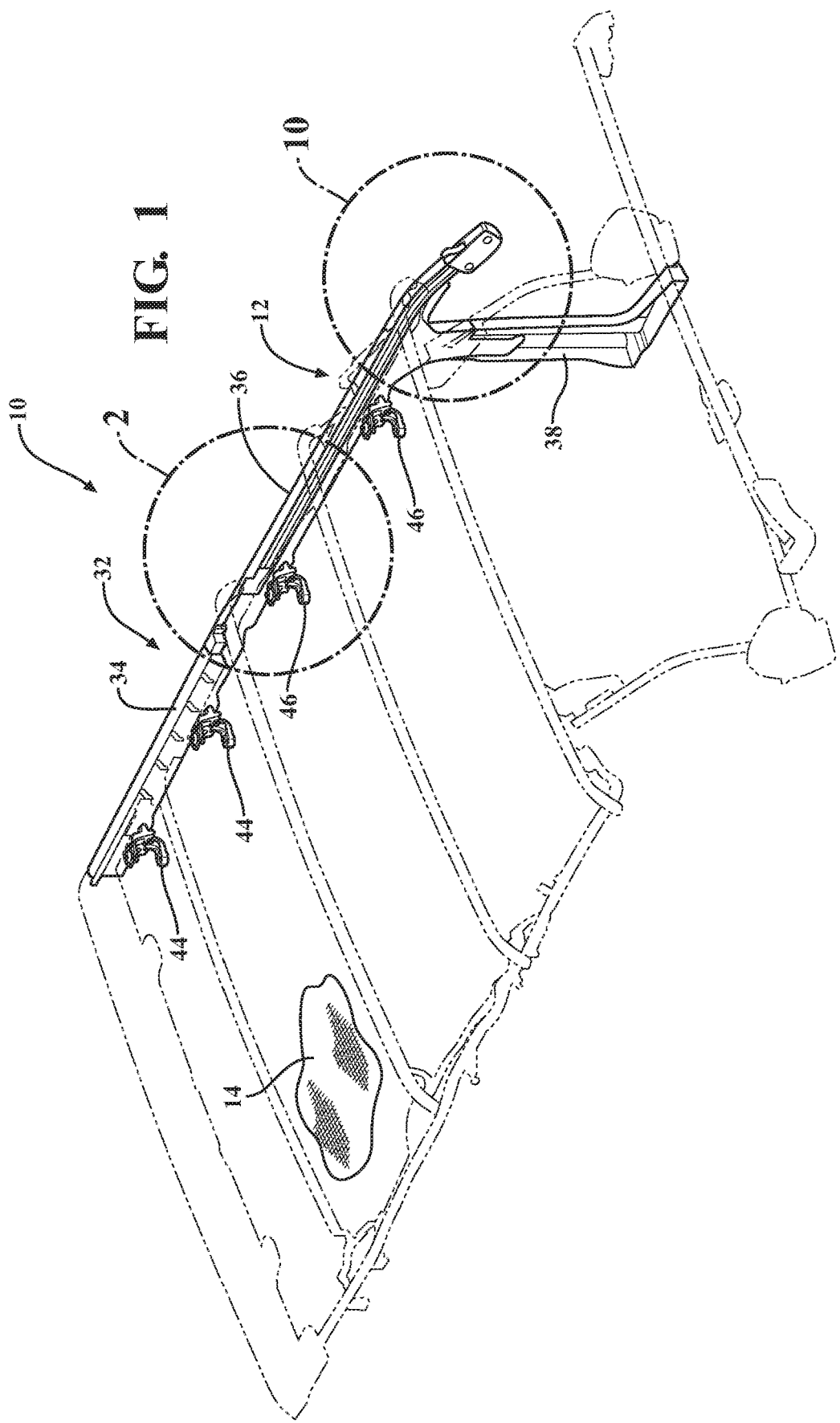
FIG. 1 is a perspective view of a panel top assembly, in a closed position, with a cover removed for clarity, in accordance with the present invention.
Figure 2:
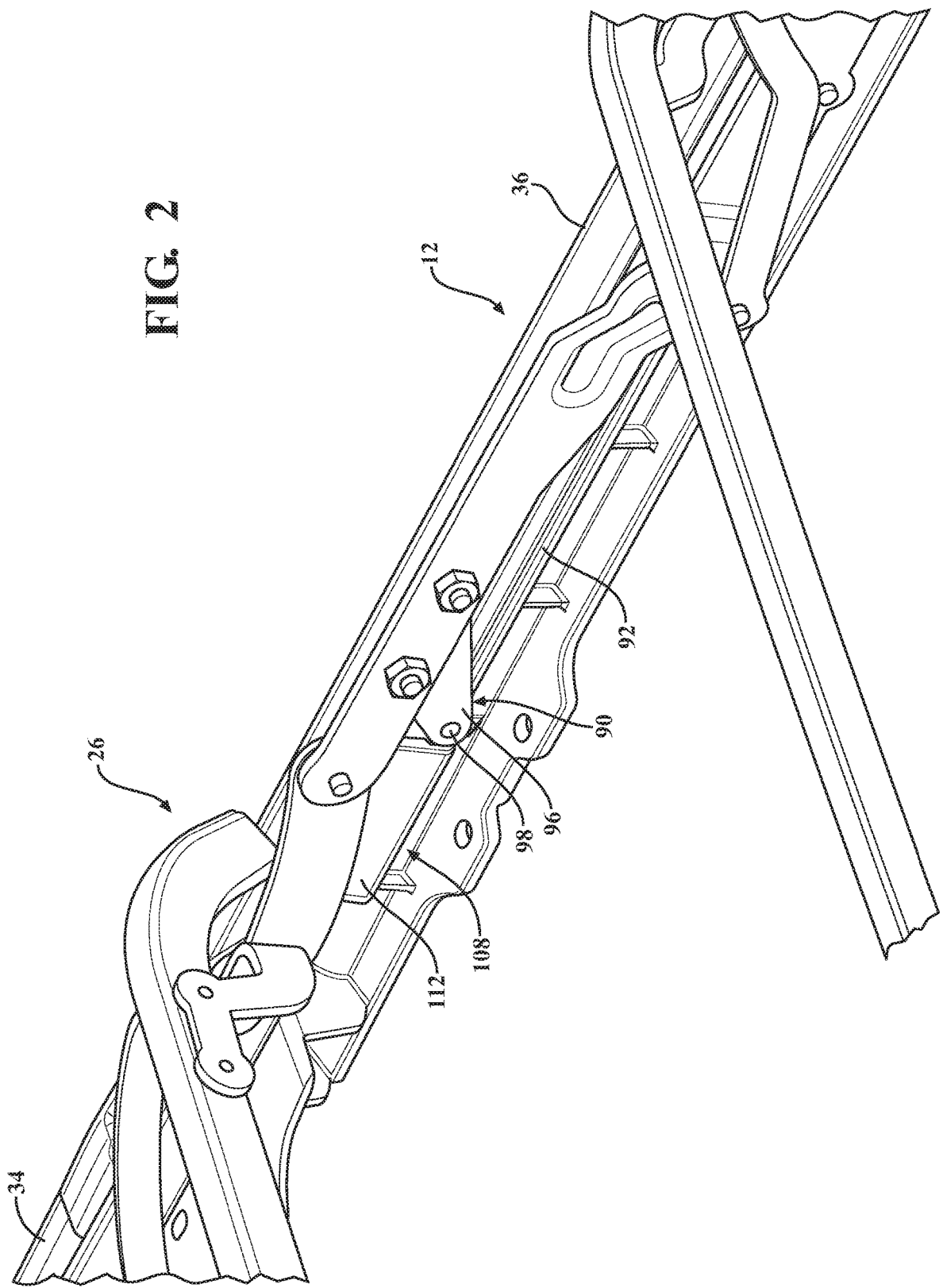
FIG. 2 is an enlarged perspective view taken at Circle 2 of FIG. 1, and, depicting an isolation assembly and guide roller assembly in a track of a guide track assembly, in accordance with the present invention.
Figure 3:
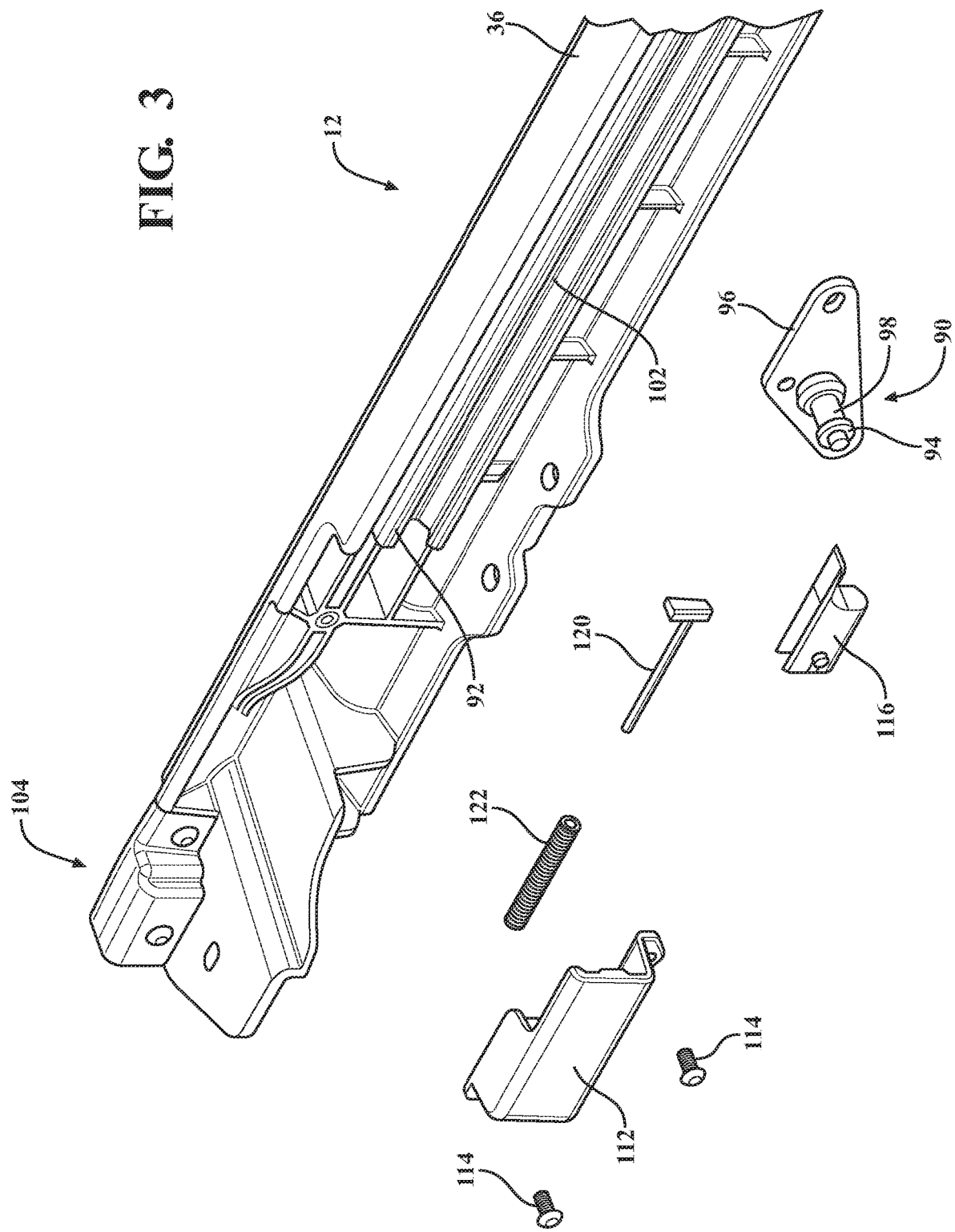
FIG. 3 is an exploded view taken from FIG. 2, in accordance with the present invention.
Figure 17:
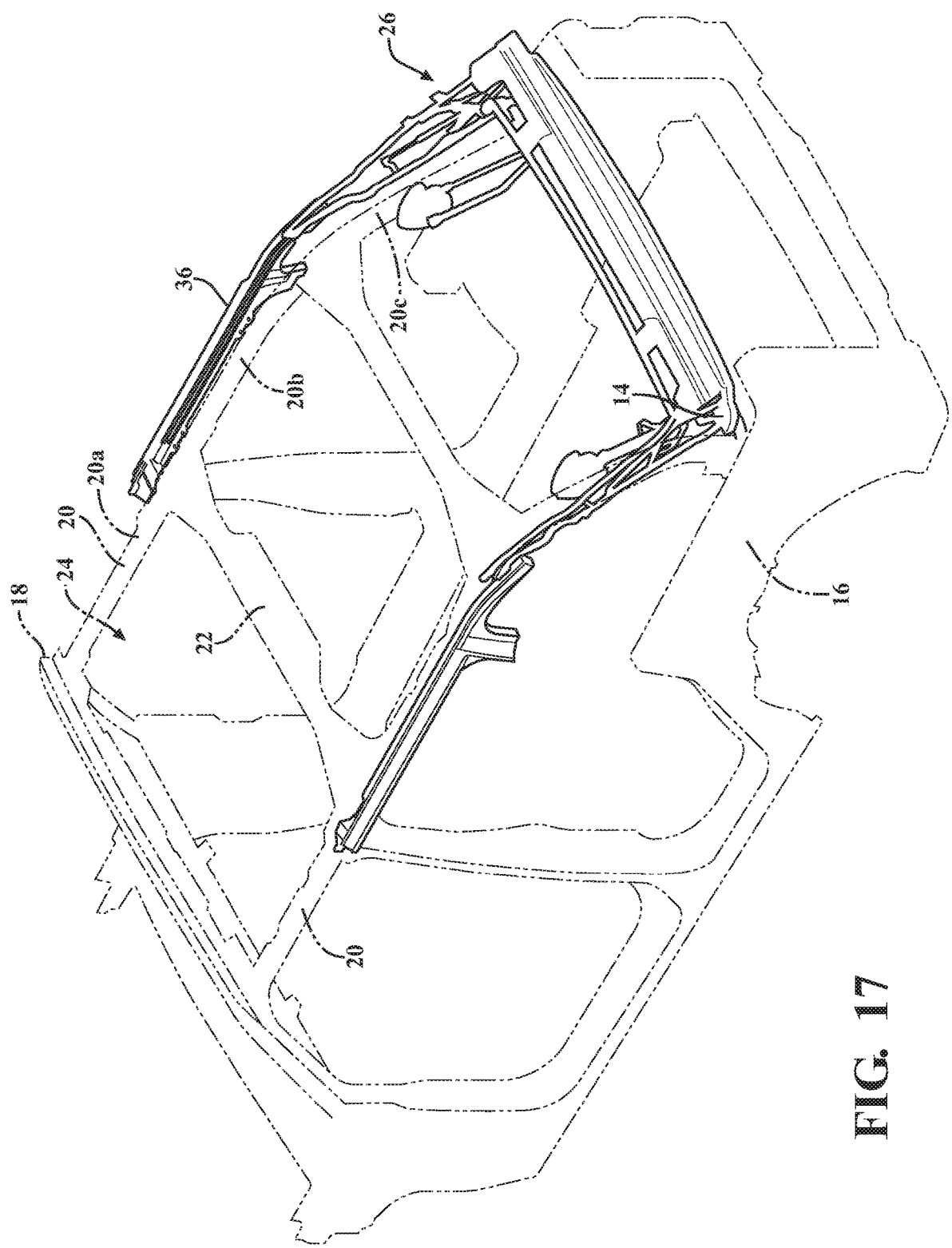
FIG. 17 is a perspective view of panel top assembly in a top down/open position, with a pair of front door rails omitted for clarity, in accordance with the present invention.
Figure 18:
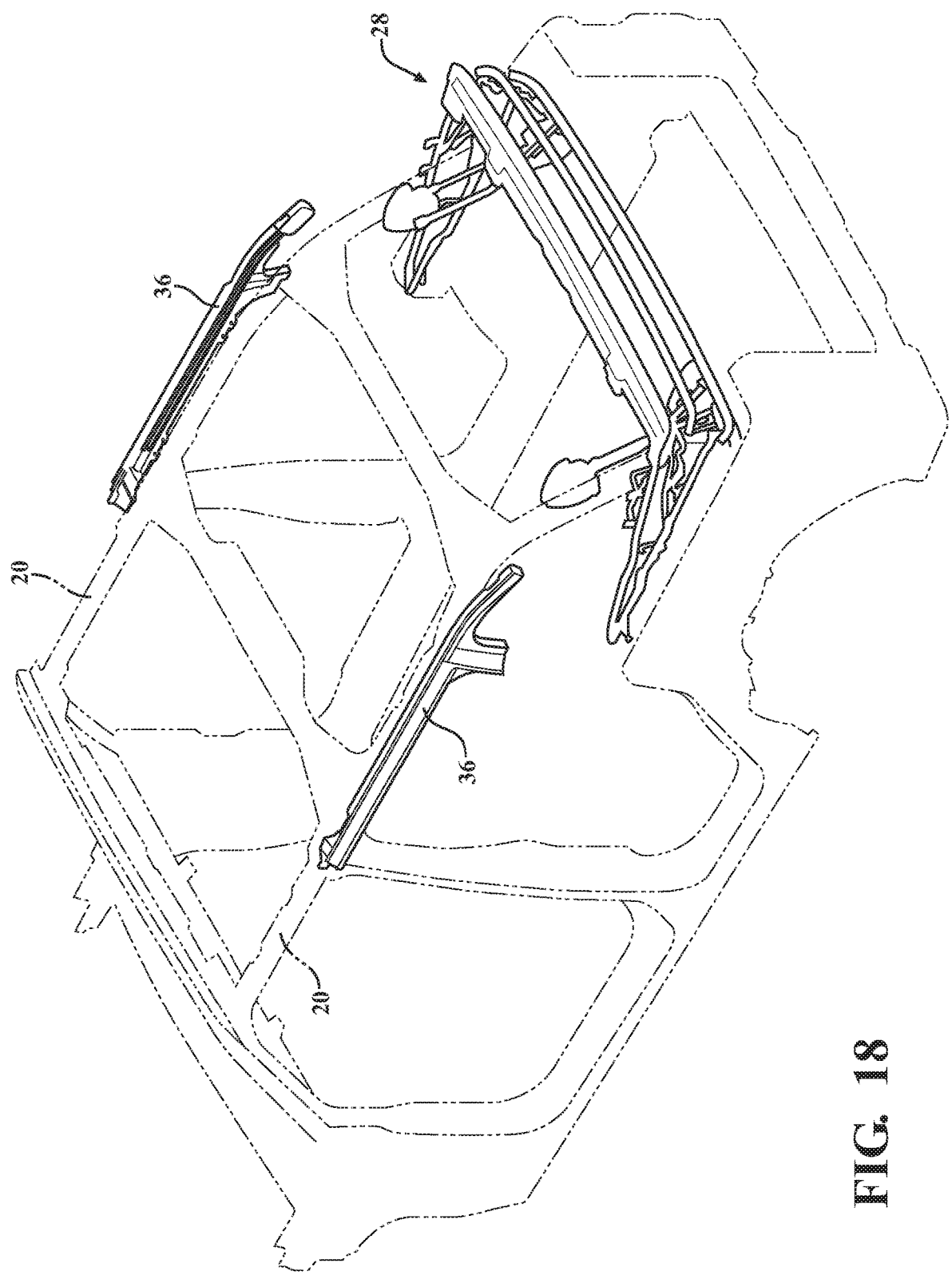
FIG. 18 is a perspective view of the panel top assembly having been released from the guide track by the second isolation assembly and positioned in a open/stowed position, in accordance with the present invention.
Figure 22:
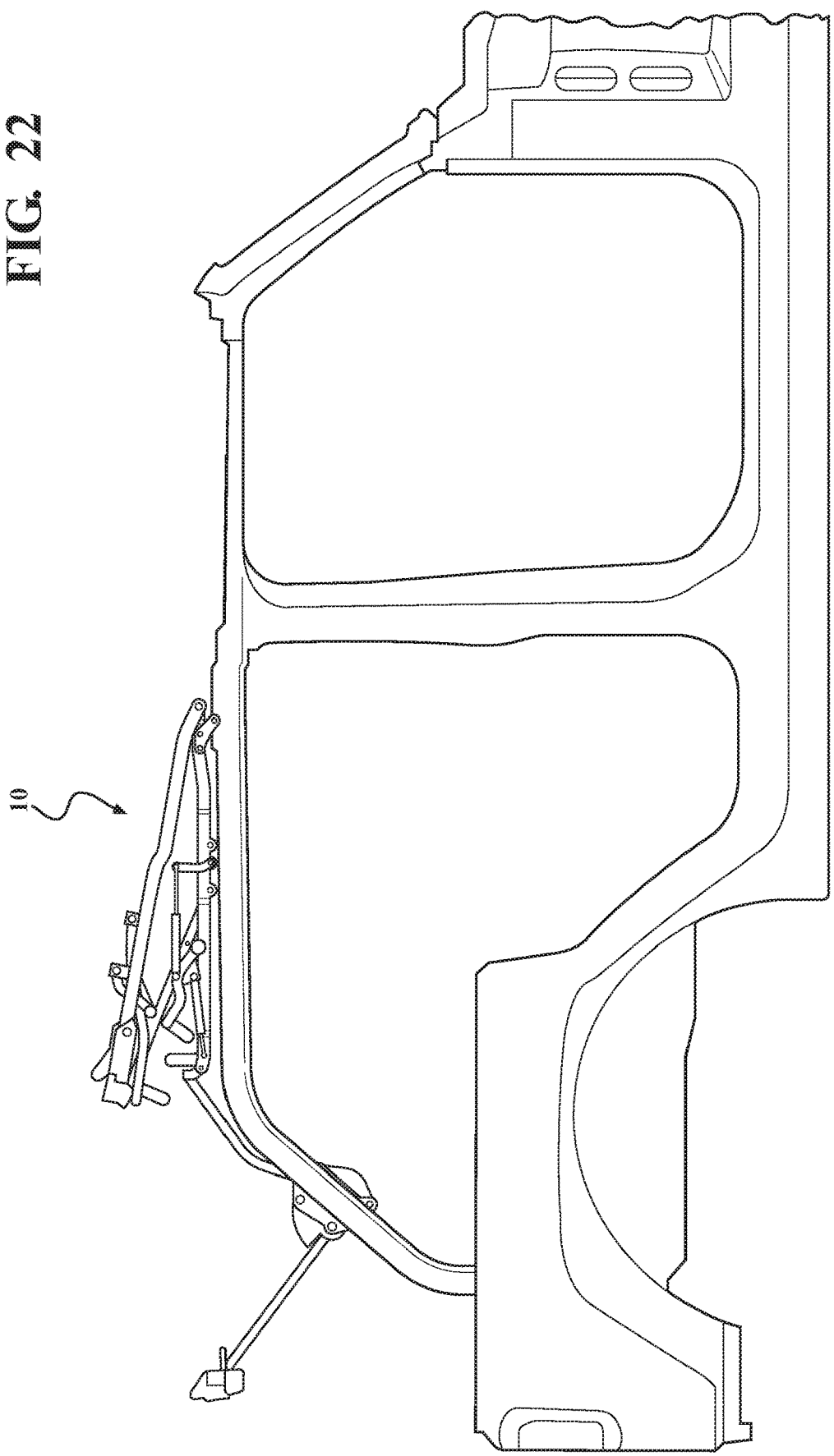
FIG. 22 is a side elevation view of the panel top assembly in an open sunroof position, with a door rail assembly omitted for clarity, in accordance with the present invention

Referring to FIGS. 1-3, 5, 7-12 and 14-22 generally, a panel top assembly is shown generally at 10, including a guide track system shown generally at 12, in accordance with the present invention. Most preferably, the panel top assembly 10 is a soft top assembly with a cover 14 that selectively closes off a roof top opening when desired (e.g., FIG. 1) and also opens when desired e.g., to provide a sunroof opening (e.g., FIG. 21), and is retractable further to other positions for more open air feel (e.g., FIGS. 17 and 18). The guide track system 12 is operably attached to a vehicle 16.

The vehicle 16 generally includes a windshield frame header 16 with side members 20,20 (preferably, vehicle roll bar or sport bars) extending generally therefrom and at least one cross member 22 connecting the side members 20,20 substantially adjacent the rear of the front cockpit compartment indicated generally at 24. There are a plurality of sport bars on the vehicle. There are at least two sport bars 20,20. Preferably, the sport bars 20,20 generally providing a forward portion 20a, rearward portion 20b and rear most portion 20c. Preferably, each guide track system 12 is connected to at least one respective sport bar, most preferably, to the rearward sport bar 20b.

The panel top assembly 10 also includes a moveable frame assembly, shown generally at 28, that includes a pivotal portion, shown generally at 26. The moveable frame portion 28 preferably has a plurality of linkage assemblies. The assembly 10 includes a plurality of bows, a plurality of fabric management bows, the cover 14 operably connected to at least the moveable frame portion 28, and, preferably, at least one lift assist mechanism. Preferably, the present invention includes gas cylinders 30,30 and control linkages to assist with lifting and controlling motion of the pivotal portion. The assembly 10 is operable to move the pivotal portion 26 between a closed position (to close the roof opening of the vehicle) and an open position or "sunroof" position (which uncovers the front cockpit of the vehicle). Additionally, the assembly 10 is slidable to move the moveable frame assembly 28 between the open sunroof position and a plurality of top down positions to create further open air experiences. Optionally, at least one lock mechanism is provided, e.g., with a quick release detent, tongue and loop straps, etc to prevent the moveable frame assembly 28 from sliding rearward when in the open sunroof position.

At least one pair of door rail assemblies, shown generally at 32, are provided. Preferably, each door rail assembly includes at least a first door rail 34 and a second door rail 36 operably connected to a respective at least one side sport bar of the vehicle. The pair of first door rails 34,34 are connected to the vehicle 16 in a generally fore/aft direction, preferably, to the right hand/left hand sport bars 20,20. Most preferably, the pair of first door rails 34,34 are front door rails connected to the front portion sport bars 20a,20a of the vehicle 16. The pair of first door rails 34,34 provide a water tight seal with the cover 14 of the top assembly 10 when in the closed position. Preferably, the pair of first door rails 34,34 also provide a water tight seal against the vehicle doors, e.g., front doors.

The pair of second door rails 36,36 are connected to the vehicle 16. Most preferably, the second door rails 36,36 are rear door rails connected to rearward portion sport bars 20b,20b of the vehicle 16 in a generally fore/aft vehicle direction. The pair of second door rails 36,36 provide a water tight seal with the cover 14 of the top assembly 10 when in the closed and open sunroof positions. Preferably, the pair of second door rails 36,36 also provide a water tight seal against the vehicle doors, e.g., rear doors. Preferably, the pair of second door rails 36,36 additionally include a generally vertical portion 38 operably attached to a pillar area of the vehicle, e.g., a generally downward depending portion connected, e.g., by at least one fastener 40, generally at the vehicle sides behind passenger seating, preferably, to a C-pillar of the vehicle behind rear passenger seating, indicated generally at 42.

The pair of second door rails 36,36 are a integrated single piece or multiple pieces operably connected together depending on the application without departure from the scope of the present invention. It is further understood that the front and rear door rails 34,34 are a single piece integrated pieces or multiple pieces operably connected together depending on the application without departure from the scope of the present invention. Preferably, the front and rear door rails 34,36 are formed of a molded material, e.g., lightweight molded material. It is understood that the first and second pairs of door rails 34,34 and 36,36 are operably adaptable (e.g., shape, length, width, height, material, etc) to the vehicle depending on the application, e.g., four door vehicles and two door vehicles, SUVs, etc, without departure from the scope of the present invention.

At least one clamp 44, preferably, a plurality of clamps 44, connect each first door rail 34 to the vehicle, preferably, to the sport bar 20a (such as by mushroom knobs or any other fasteners suitable for attachment to the vehicle through the clamp 44 and sport bar or any other predetermine suitable vehicle part). At least one second clamp 46, preferably, a plurality of second clamps 46, connect each second door rail 36 to the vehicle 16, preferably, to the sport bar 20b (such as by mushroom knobs or any other fasteners suitable for attachment to the vehicle through the clamp 46 and sport bar or any other predetermine suitable vehicle part). By way of non-limiting example, the sport bar is held to or between upper and/or lower clamping surfaces and a threaded fastener extends through the clamp(s) 44,46 and sport bar to secure the door rail assemblies to the sport bar. The clamps 44,46 are fixed or rotatable to the clamping positions. More or less clamps 44,46 are contemplated depending on the application without departure from the scope of the present invention.

The panel top assembly's 10 moveable frame assembly 28 is operably connected to the pair of door rail assemblies 32. The pivotal portion 26 is foldable to a sunroof position to expose the front cockpit to the open air. The cover 14 is provided, which is most preferably made of a soft foldable material. When an occupant wants the roof top opening closed off, the pivotal portion 26 is closed, e.g., generally rotated forward toward the windshield frame, and latched or otherwise suitably connected to the vehicle. When an occupant wants the open air sunroof position, the pivotal portion 26 is released from the vehicle windshield frame, e.g., latch mechanism released from footman loops, and flipped generally rearward to expose the front cockpit roof top opening.

The moveable frame assembly 28 incorporates articulating linkage assemblies. The linkage assemblies include at least one pivot point, respectively, for rotation relative to the pair of door rail assemblies 32. Preferably, the moveable frame assembly 28 linkage assemblies include at least one pair of first side rails 48. The first side rails 48 are pivotally connected toward one end to a pair of second side rails 50 at a first joint, shown generally at 52, respectively. The pair of first side rails 48 are connected toward another end to a header 54 or "first bow" or "1-bow", which operably connects to the windshield frame in the closed position to close out the vehicle interior. The second side rails 50 are selectively slidably connected to the guide track system 12 to move the top movable mechanism, as in the entire moveable frame assembly 28 including the pivotal portion 26 and etc, from the sunroof open position to further retracted positions for more open air experience, as will be explained in greater detail below.

Preferably, the articulating linkage assemblies of the moveable frame assembly 28 includes a plurality of linkages and fabric management bows. There is provided at least a 4-bow 56 on a first linkage assembly shown generally 58. At least a 3-bow 60 provided on a second linkage assembly, shown generally at 62. At least a 2-bow 64 is provided on a third linkage assembly, shown generally at 66. The third linkage assembly 66 also includes the first door rail 48 that is rotatably connected to the second door rail 50. A pair of 5-bows 68 are also provided operably connected to a pair of 5-bow uprights 70. The 5-bow uprights 70 are each rotatably connected to a lift assist indicated generally at 72 and coupled to a bracket 75 that is connected to the sport bar, preferably, to the rear most sport bar 20c. Preferably, a rear bow 76 is also provided on second upright bows 78 rotatably connected to the sport bars 20c,20c. Preferably, a plurality of pivot points are provided on the second door rail 50. Most preferably, a first pivot point 80 is provided on the second side rail 50 for a first link 82 of the second linkage assembly 62, and a second pivot point 84 is provided on the second rail 50 for a first link 86 of the first linkage assembly 58. Optionally, at least one limiting stop is provided to set the height of at least one linkage and/or the first side rail in the open sunroof position. Any other linkage arrangements are contemplated depending on the application, suitable for pivoting the top to an open sunroof position or larger open roof top position, without departure from the scope of the present invention.

The cover 14 is operably listed to a predetermined plurality of bows to move between at least the closed position, open sunroof position, open/down position, and a released down position, e.g., wherein the pivotal portion is selectively released from the guide track assembly. Preferably, the cover is operably connected over at least a plurality of bows, most preferably, to at least the header 54 or "1-bow", 4-bow 56, 3-bow 60, 2-bow 64, 5-bow 68, and/or rear bow 76 and any combinations thereof.

The fabric management bows (e.g., 4-bow 56, 3-bow 60, and/or 2-bow 64, etc and any combinations thereof) manage fabric of the cover 14 during movement of the cover between the closed and open positions. The fabric management bows also minimize fabric movement when the soft panel top assembly is in the closed position, minimizes fabric movement in the closed position to cut down on noise, and manages fabric during operation between positions.

More or less linkages, bows/fabric management bows, side rails, door rails, pivot points, and pivot joints are contemplated depending on the application without departure from the scope of the present invention.

Most preferably, at least two guide track assemblies 12,12 are connected to opposite vehicle features, respectively, preferably, to opposite sport bars, most preferably, opposing rearward sport bars 20b,20b, respectively. At least one guide roller assembly indicated generally at 90 is slidably connected to each guide track assembly 36 for moving the panel top assembly 10 from the open sunroof position to further open positions, and vice versa.

The guide track assembly 12 includes at least one track 92 operably connected to at least the second door rail 36, e.g., rear door rail. Alternatively, the track 92 is integrally formed with the second door rail 36.

Each guide roller assembly 90 includes at least one guide roller 94 slidably disposed in the track 92. The guide roller assembly 90 also has at least one bracket 96 supporting a pin 98 for the roller 94. The bracket 96 is operably connected to the first or second side rails 34,36, preferably, to the second side rail 36, most preferably, to the second side rail 36 which is a rear side rail by at least one fastener, e.g., bolt, screw, etc. Preferably, the bracket 96 generally extends downward from the rear side rail 36 for slidably engagement of the roller 94 within the respective track 92. Preferably, the pin 98 is mounted in an aperture 100 formed as part of the bracket 96, and, mounted toward the end of the pin 98 is the roller 94.

The guide track 92 is substantially C-shaped or otherwise suitably shaped to prevent the roller 48 from moving laterally out of the opening 102 in the track in a cross car direction. Rather, the roller 94 is maintained in the track 92 as the roller 94 is slid in the track 92 generally in fore/aft and up/down directions. It is within the scope of the present invention that other track cross-sections are suitable as well. Preferably, the track 92 is also curved generally downward toward the rear section of the track 92 toward the rear or tailgate of the vehicle. It is within the scope of the invention that other curvatures/angles are suitable depending on the particular application.

Each guide track assembly 12 includes a forward end indicated generally at 104 and a rearward end indicated generally at 106. At least one first isolator assembly, shown generally at 108, is located toward the forward end of the track 92 of each guide track assembly 12 as an anti-BSR feature, e.g., to eliminate potential for BSR between the roller 94 and the guide track 92. At least one second isolator assembly, shown generally at 110, is located toward the rearward end of the track 92 of each guide track assembly 12 as another anti-BSR feature, e.g., to eliminate potential for BSR between the roller 94 and the guide track 92.

The first isolator assembly 108 includes at least one isolator cover 112 operably coupled to the guide track 92 (preferably, connected by at least one fastener 114), at least one isolator 116 located inside the guide track 92, and at least one biasing member 118 located in engagement with the isolator 116 and isolator cover 112. Preferably, the biasing member 118 is a spring guide pin. Most preferably, The isolator cover 112 is connected to the rear door rail 36 and/or track 92 with at least one fastener 114. Preferably, the biasing member 118 includes a guide pin 120 and a spring 122 over the pin shaft. Most preferably, the biasing member includes the guide pin 120 coupled to the isolator 116 at one end and received in the isolator cover 112 toward the other end, and the spring 122 over the pin 120 shaft.

Figure 4:
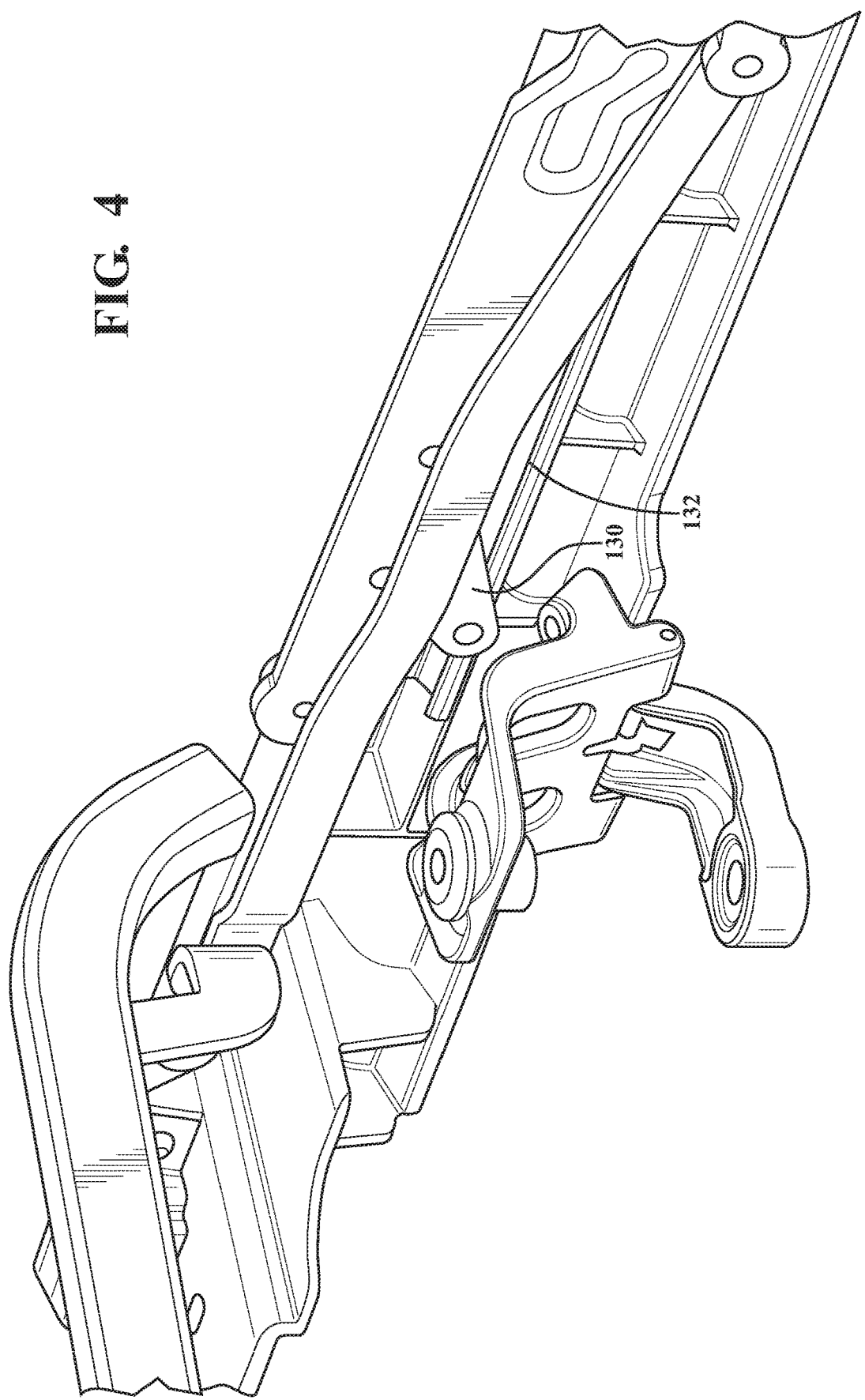
FIG. 4 is perspective view of an undesirable system with no isolator feature at the front of the track.
Figure 6:
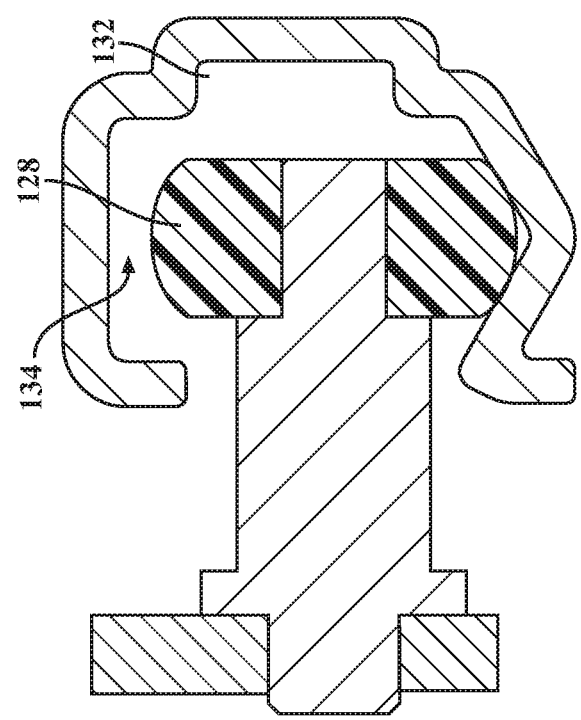
FIG. 6 is a cross sectional view depicting an undesirable system with no isolator feature to restrict guide roller movement in the guide track.
Figure 5:
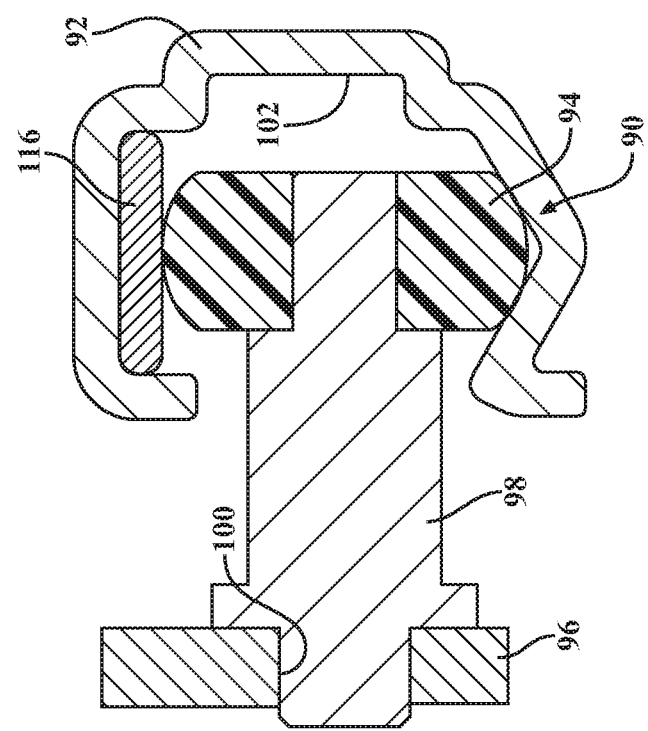
FIG. 5 is a cross sectional view depicting the isolator feature restricting movement of a guide roller in a guide track, in accordance with the present invention.

The isolator 116 is shaped for directly abutting the guide roller 94. When the assembly 10 is in an up or closed position (e.g., closed position and sunroof open position), the roller 94 presses against the isolator 112 in a first direction toward the biasing member 118. The isolator 112 preferably includes a profiled portion 124, e.g., generally curved, to generally follow the shape of the roller 94 to fit between the top of the roller and the interior surface 126 at the top of the track. The guide roller 94 movement is restricted generally up and down in the track 92 by the isolator 116 when the panel top assembly 10 is in the up or closed position (e.g., see FIG. 5). This is a significant improvement over prior art such as FIGS. 4 and 6 having no isolator so there is too much free play/slop, indicated generally at 134, of the roller 128 of the assembly 130 in the track 132. This can cause issues such as BSR, etc or otherwise make operation of the top harder.

The isolator 116 is disposed in the track 92 toward the front end of the track 92. Preferably, the biasing member 118 forms a general T-section shape where the end of the guide pin 120 that is rearward facing fits into a recess or slot 136 formed in the isolator 116. The spring 122 fits over the spring guide pin 120, and, the forward end of the spring guide pin 120 is operably coupled to the isolator cover 112 (e.g., such as through an aperture 138, etc). The spring 122 generally biases the guide pin 120 and isolator 116 in a rearward position within the track 92. In operation, the guide roller 94 is free to move forward and back (fore and aft) in the track 92 when the guide roller assembly 90 is in a free state (e.g. see FIG. 9A). However, when the guide roller assembly 90 moves forward enough, as indicated in the direction of the arrow 'F', the guide roller 94 engages the isolator 116 (e.g., see FIG. 9B assembly shown with the roller 94 contacting the isolator 116). As the panel top assembly 10 is moved into the closed position, the isolator 116 and guide roller assembly 90 slide forward into a final closed position (e.g., see FIG. 9C). As the guide roller 94 pushes on the isolator 116, the guide roller 94 overcomes the bias and pushes the isolator 116 and spring guide pin 120 forward toward the isolator cover 112. Preferably, the isolator cover 112 includes a chamber 140 to receive the spring guide pin 120 as the pin 120 is pushed forward by the assembly 90 into the closed position (e.g., see FIG. 9C).

The second isolator assembly 110 is located toward the rearward end of the track 92 as an anti-BSR feature, e.g., to eliminate potential for BSR between the roller 94 and the rearward end of the guide track 92. The second isolator assembly 110 generally incorporates a top mechanism install/release feature. Generally, the anti-BSR reduces or eliminates the audible noise from this region. Typically, the anti-BSR provides a higher performance predetermined low-noise vibration system.

The second isolator assembly 110 includes at least one second isolator cover 142 operably coupled to the second door rail 26 directly adjacent to the guide track 92 and/or to the rail 36 and guide track 92 (preferably, connected by at least one fastener 144), at least one second isolator 146 located toward an end of the guide track 92, e.g., at least partially inside the guide track 92, and at least one second biasing member 148 located in engagement with the isolator 146 the cover 142. Preferably, the biasing member 148 is a spring guide pin. Most preferably, the biasing member includes a guide pin 150 coupled to the isolator 146 (e.g., received through an aperture 152) at one end and received in the isolator cover 142 toward the other end, and a spring 154 over the pin shaft.

Most preferably, the rear upper part 156 of the guide track is longer than the rear lower part 158 of the guide track and the second isolator 146 includes a profiled portion 160 that is located in an opening 162 formed by the lower part 158 in the guide track being shorter than the upper part 156 of the guide track 92. The profiled portion 160 closes off the opening 162 and is selectively moved to open up the opening 162. It is understood that alternatively, the opening 162 is located in the upper part of the guide track. The profiled portion 160 is a curved portion, flange, U-shaped portion, and/or C-shaped portion or any shape suitable for guiding the roller and closing off the opening and/or combinations thereof.

Figure 13:
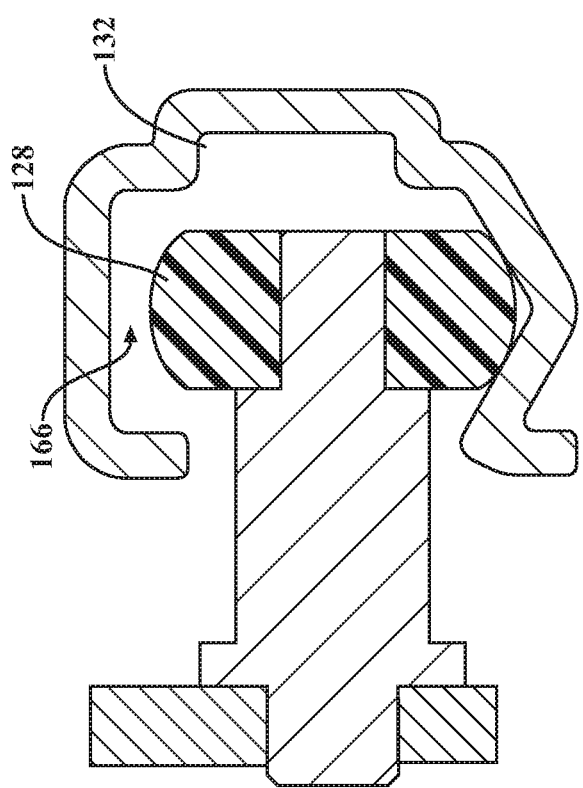
FIG. 13 is a cross sectional view depicting an undesirable system with no rearward isolator feature to restrict guide roller movement in the guide track.
Figure 12:
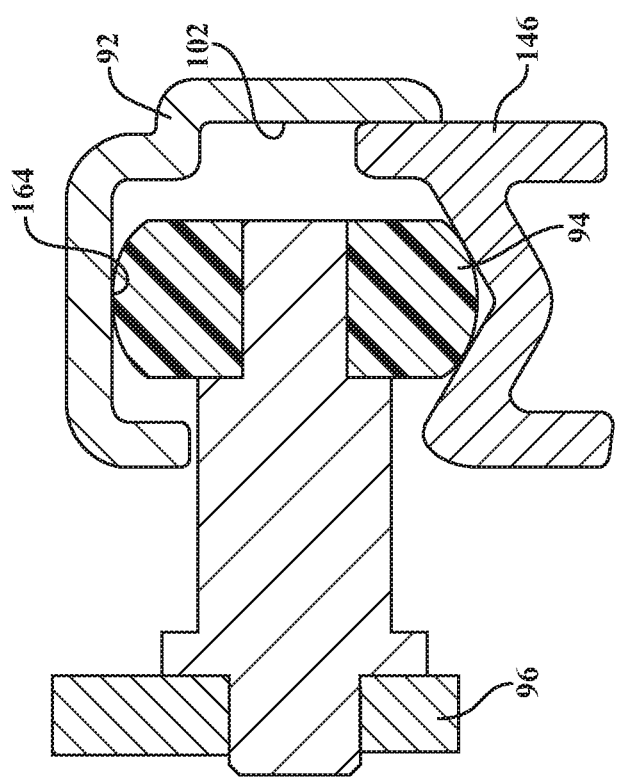
FIG. 12 is a cross sectional view depicting the second isolator feature restricting movement of the guide roller in the guide track, in accordance with the present invention.
Figure 14:
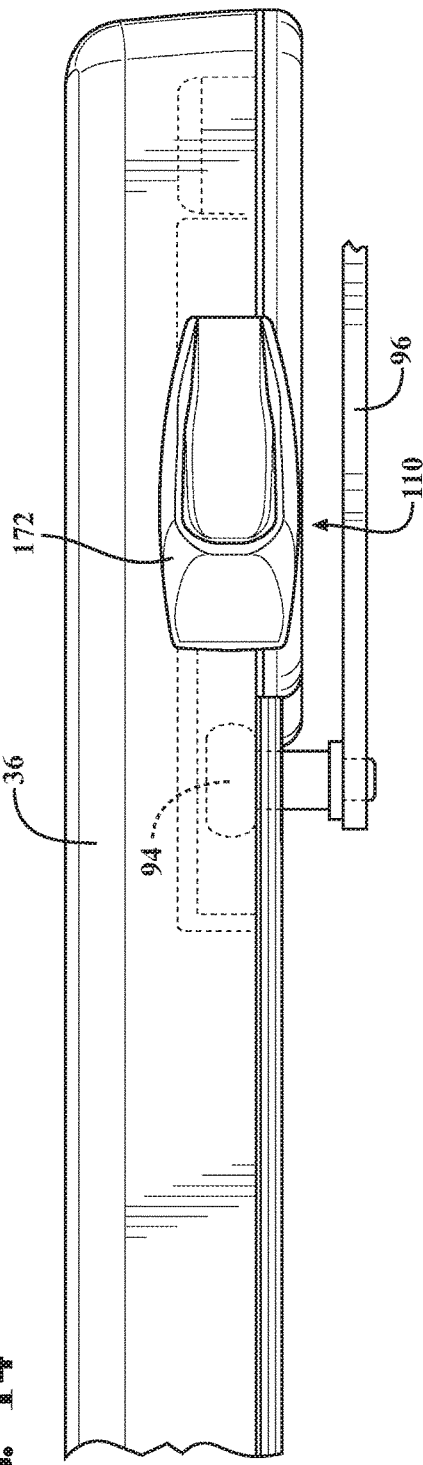
FIG. 14 is a top plan view of the second isolation assembly including a release feature to selectively disengage an isolator from the guide track, in accordance with the present invention.
Figure 15:
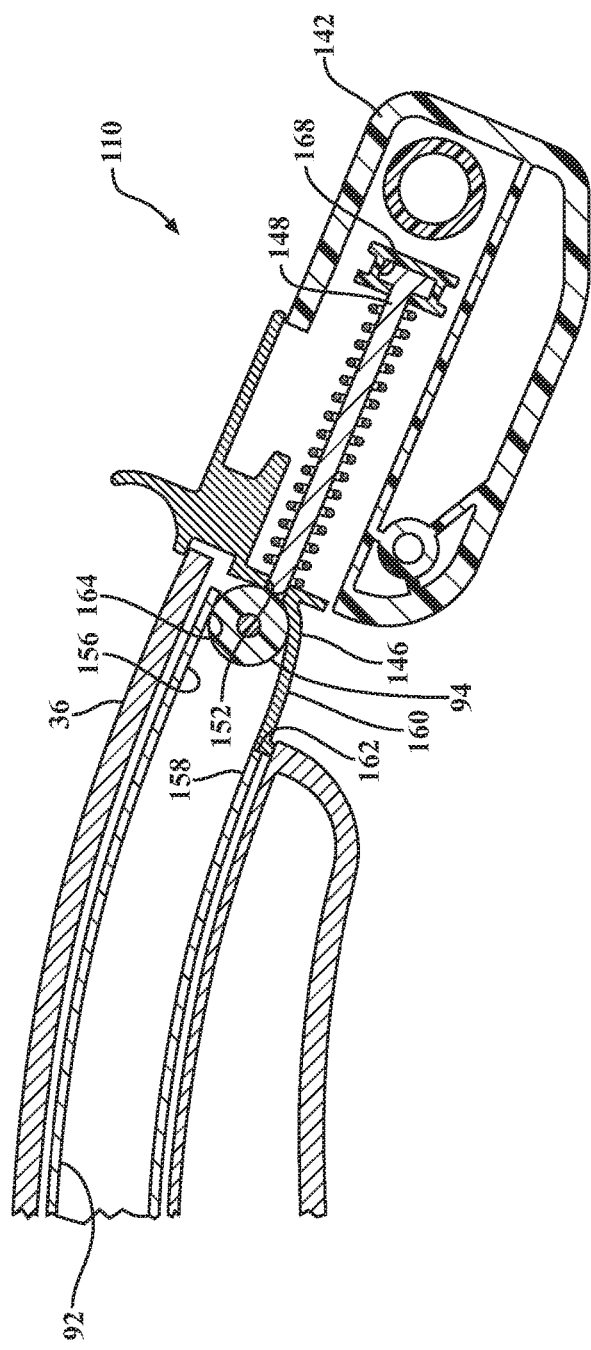
FIG. 15 is a cross sectional view depicting the guide roller in the guide track in engagement against the second isolator assembly, in accordance with the present invention.

The second isolator 146 is shaped for directly abutting the guide roller 94. When the assembly 10 is in the down/open position, the roller 94 presses against the isolator 146 in a second direction toward the biasing member. The isolator 146 preferably includes a general curvature to generally follow the shape of the roller 146 and direct the roller 146 against an interior surface 164 at the upper part 156 of the track. The guide roller 94 movement is restricted generally up and down in the track 92 by the isolator 146 when the panel top assembly 10 is in the down/open position (e.g., see FIG. 12). This is a significant improvement over prior art such as FIG. 13 having no isolator so there is too much free play/slop, indicated generally at 166 of the roller 128 in the track 132. This can cause issues such as BSR, etc or otherwise make operation of the top harder.

The second isolator 110 is preferably disposed at least partly in the track 92 toward the rearward end of the track 92. The biasing member 148 forms a general T-section shape where one end of the second guide pin 150 that is rearward facing fits into a slot or opening 168 formed in the second cover 142. The spring 154 fits over the pin 150, and, a forward end of the guide pin 150 is operably coupled to the second isolator 146 (e.g., such as through the aperture 152, etc). In operation, the guide roller 94 is free to move generally forward and back (fore and aft) and along the downward curve in the track 92 when the guide roller assembly 12 is in a free state (e.g. see FIG. 16A). However, when the guide roller assembly 94 moves rearward enough, as indicated in the direction of the arrow 'r', in moving the panel top assembly 10 into the down/open position, the guide roller 94 engages the second isolator 146 (e.g., see FIGS. 16B and 19). The second isolator assembly 110 keeps the guide roller assembly 90 in the track 92 at the rearward end of the track when the assembly 10 is in the down/open position.

The second isolator assembly 110 also includes a top mechanism install/release feature. Preferably, the release feature is integrated with the isolator 146 or operably connected thereto. The isolator 146 also includes an upper surface 170 extending from a handle 172 or "release pull" to selectively close off an upper opening 174 in the second cover 142. Pulling the isolator handle 172 generally rearward causes the second isolator 146 to move generally rearward for releasing the guide roller 94 from the track 92. As the isolator 146 is slid in the rearward direction the opening 162 is created in the lower part 158 of the guide track allowing the roller 94, and therefore the top folding/sliding panel mechanism, to drop out of the track 92 (see FIG. 20 indicated at 'd') and allowing positioning of the top by an operator in a fully down/open position (see FIG. 18).

To reinstall the frame assembly/guide rollers 94 back into the track 92, the operation is reversed.

Incorporating more than one guide roller assembly 12 or an extended guide roller assembly 44 on each side of the vehicle is contemplated depending on the application without departure from the scope of the present invention.

It is understood that the left side of the panel top assembly 10 is preferably a substantially mirror image to the right side depicted in the figures.

While a 4-door vehicle is illustrated, it is understood that the present invention is adaptable for a 2-door vehicle, 2 or 4-door SUV with extended cargo area, and any other vehicle, without departure from the scope of the present invention.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A panel top assembly for a vehicle, comprising:
a moveable frame assembly operably coupled to a cover for selectively opening or closing off a roof top opening, when desired;
at least one guide track operably coupled to the vehicle;
at least one guide roller slidable in said at least one guide track; and
at least one isolator assembly operably coupled within said guide track and including at least one isolator to restrict movement of said at least one roller in said at least one track.

2. The panel top assembly of claim 1, at least one other isolator assembly operably connected toward a forward end of said at least one guide track, and wherein said at least one isolator assembly is operably connected toward a rearward end of said at least one guide track.

3. The panel top assembly of claim 1, wherein said at least one isolator includes a handle that, when selectively moved by a user in a first direction, causes said at least one isolator to also move in said first direction to uncover an opening in said at least one guide track to allow release of said roller from said at least one guide track to allow said moveable frame assembly to be dropped down to said stowed position.

4. The panel top assembly of claim 3, wherein said at least one guide roller is then selectively reinstalled into said guide track via said opening to thereby reinstall the moveable frame assembly to said guide track system.

5. The panel top assembly of claim 1, further comprising a profiled portion on said at least one isolator to direct said at least one guide roller against an inner surface of said at least one guide track, wherein said at least one guide roller rolls rearward in said at least one guide track until engaging said at least one isolator where said at least one guide roller is directed toward said inner surface of said guide track to restrict up/down movement of said at least one guide roller in said at least one guide track.

6. The panel top assembly of claim 1, wherein said at least one isolator assembly includes at least one biasing member operably coupled to said isolator and to a cover of said isolator assembly.

7. The panel top assembly of claim 1, wherein said at least one isolator assembly includes at least one biasing member that is a spring guide pin.

8. The panel top assembly of claim 1, wherein said at least one isolator selectively retains said at least one guide roller assembly in the rearmost portion of said at least one guide track to keep said moveable frame assembly in an open/down position.

9. The panel top assembly of claim 1, further comprising at least one other isolator assembly coupled to said at least one guide track, wherein said at least one guide roller rolls forward in said at least one guide track until engaging said at least one other isolator which restricts up/down movement of said at least one roller in said at least one guide track.

10. The panel top assembly of claim 1, wherein said at least one other isolator includes a profiled portion that is positioned between said at least one roller and an inner surface of said at least one guide track when said moveable frame assembly is in an open sunroof position and/or a closed position.

11. The panel top assembly of claim 1, further comprising at least one other isolator assembly coupled to said at least one guide track, wherein said at least one other isolator assembly includes at least one biasing member operably coupled to said at least one isolator and to a cover of said first isolator assembly to restrict movement of said at least one guide roller.

12. The panel top assembly of claim 11, wherein said at least one biasing member is a spring guide pin.

13. The panel top assembly of claim 1, wherein said moveable frame assembly includes a pivotal portion including at least one side rail that is a front side rail, wherein at least one link is pivotally connected to said at least one side rail for rotating said moveable frame portion between a closed position covering the roof top opening and an open sunroof position.

14. A panel top assembly for a roof top opening of a vehicle, comprising:
a pair of guide tracks operably coupled to a pair of door rails at a roof top opening of the vehicle;
an opening formed in each of said pair of guide tracks;
a moveable frame assembly coupled to a cover and including a pivotal portion to rotate the moveable frame assembly between a closed position closing off the roof top opening and an open sunroof position, wherein the moveable frame assembly is further moveable between the open sunroof position to an open/down position and an open/stowed position;
a pair of guide roller assemblies connected to and movable with said moveable frame assembly and each having at least one guide roller slidably mounted within the pair of guide tracks;
a pair of isolator assemblies located in said pair of guide tracks to restrict up/down movement of the at least one guide roller near the rearward end of the guide track, said pair of isolator assemblies allows a user to selectively remove said guide rollers from each opening of said pair of guide tracks to then drop said moveable frame assembly to said open/stowed position at the rear of the vehicle.

15. The panel top assembly of claim 14, wherein said at least one isolator assembly further comprises:
an isolator located inside said guide track;
a biasing member operably coupled adjacent to an isolator cover and to said isolator; and
wherein said isolator fills a gap between said guide roller and an upper inward surface of said track to restrict up/down movement of said guide roller in said guide track when said moveable frame assembly is in the closed position to reduce audible noise from the guide roller in the guide track.

16. The panel top assembly of claim 15, wherein said second biasing member is a spring guide pin.

17. A soft top assembly for a vehicle, comprising:
a pair of guide track assemblies operably coupled to the vehicle;
at least one guide track integrated with or operably connected to each of the guide track assemblies;
a pair of guide roller assemblies slidably coupled to the pair of guide track assemblies;
a moveable frame assembly operably connected to the pair of guide roller assemblies and moveable between at least a closed position closing off at least one roof top opening and a stowed position;
a pair of isolator assemblies operably connected to the guide track assemblies, respectively, and each including an isolator to restrict movement of said guide roller assemblies within said guide tracks; and
a release slide in engagement with said guide tracks, said release slide is selectively removable from engagement with said guide tracks to allow said pair of guide roller assemblies to release from said guide tracks to allow said moveable frame assembly to be dropped down to said stowed position.

18. The soft top assembly of claim 17, wherein said release slide is provided on a second isolator assembly and has a profile to direct said guide roller against an inside surface of said guide tracks to restrict up/down movement of said guide roller assemblies within said guide tracks.

19. The panel top assembly of claim 14, further comprising at least one other isolator assembly operably coupled to said guide track and including at least one isolator to restrict movement of said at least one roller in said at least one track at second locations within said pair of guide tracks.

20. The panel top assembly of claim 14, further comprising at least one release slide in engagement with said pair of guide tracks, said release slide is selectively slid out of engagement with said guide tracks to allow said pair of guide roller assemblies to release from said guide tracks through said openings to allow said moveable frame assembly to down to said stowed position.

* * * * *